UNITED STATES PATENT OFFICE.

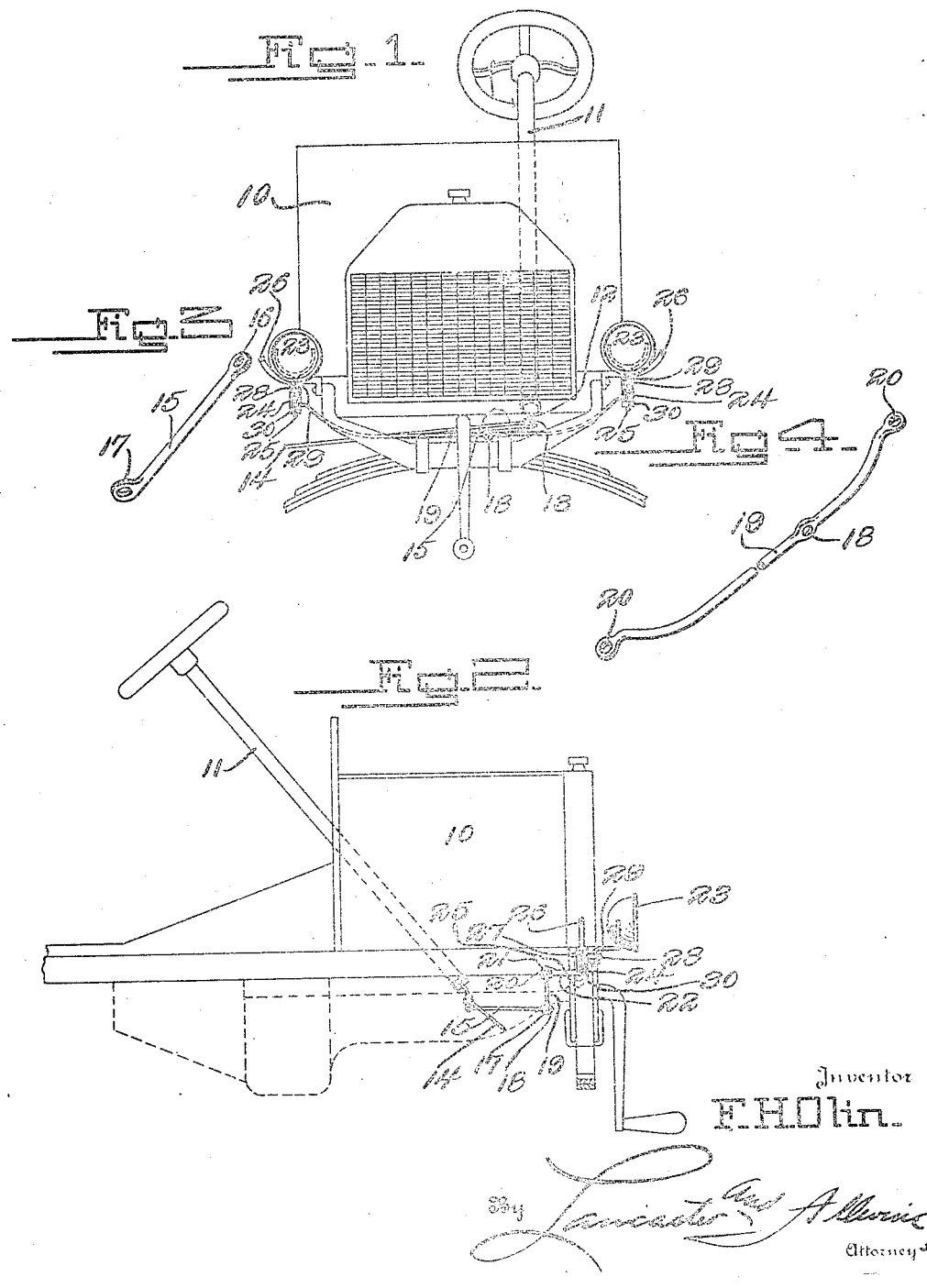

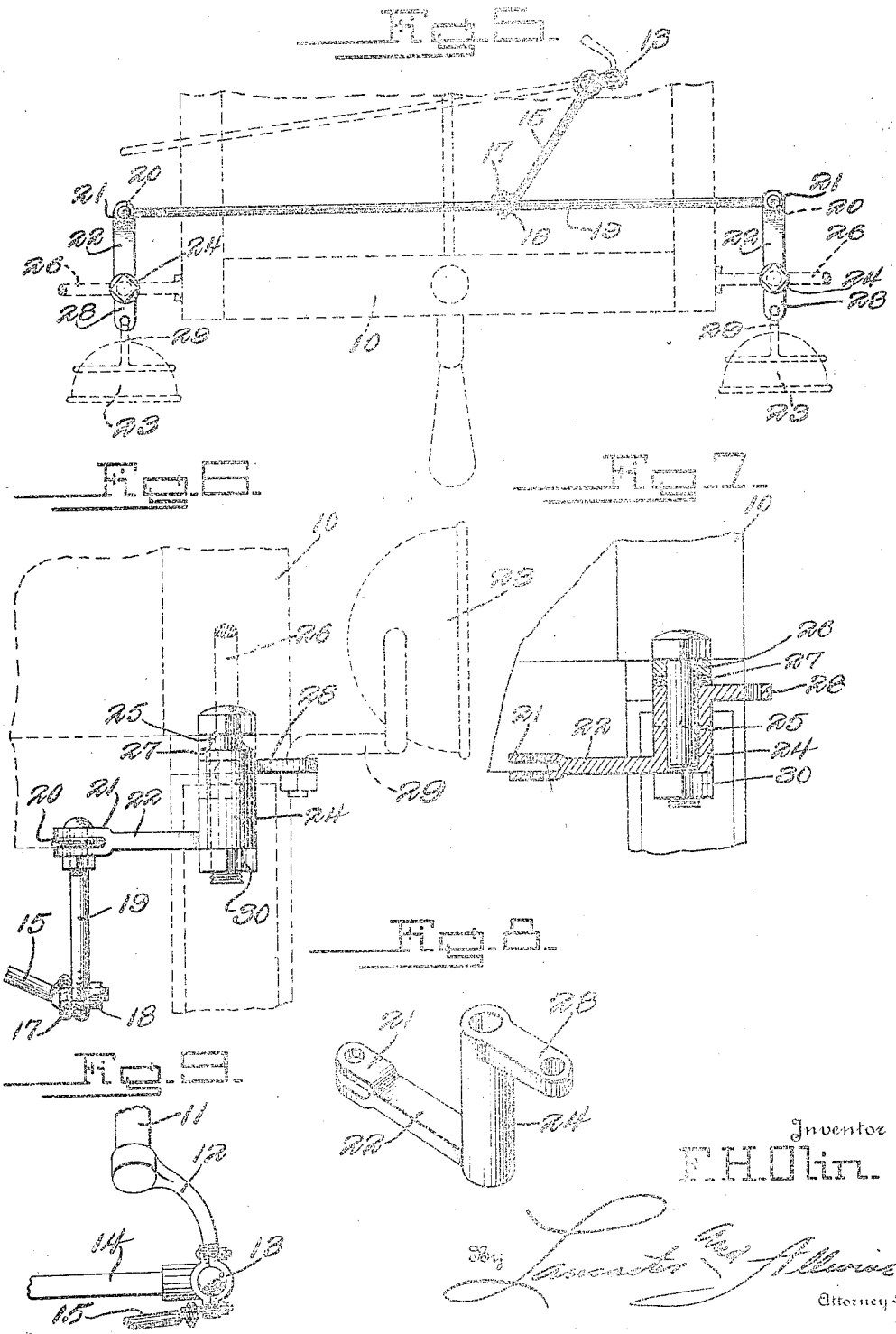

FRED H. OLIN, OF BOYNE FALLS, MICHIGAN.

DIRIGIBLE HEADLIGHT FOR AUTOMOBILES.

1,278,496.  Specification of Letters Patent.  Patented Sept. 10, 1918.

Application filed September 26, 1917. Serial No. 193,349.

*To all whom it may concern:*

Be it known that I, FRED H. OLIN, a citizen of the United States, residing at Boyne Falls, county of Charlevoix, State of Michigan, have invented certain new and useful Improvements in Dirigible Headlights for Automobiles, of which the following is a specification.

The present invention relates to dirigible lamps, and more particularly to those adapted for use on automobiles and the like.

An object of this invention is to provide a novel means for actuating the lamps of a vehicle in unison with the operation of the steering gear, so that the path of the vehicle will be effectively illuminated, and thereby prevent collision and other damages which necessarily result from not having the path of the automobile illuminated; to provide a means for automatically controlling the movement of the lamps whereby the shaft of light will be immediately varied with each deviation of the vehicle from a straight path.

Another object of this invention is to provide a structure which may be easily adjusted to an automobile or other vehicle, which is automatically operated, which is simple in construction, economical in manufacture and most efficient in its purpose.

The above and various other objects and advantages of this invention will be in part described, and in part understood, from the following detailed description of the present preferred embodiment, the same being illustrated in the accompanying drawings, wherein:

Figure 1 is a front elevation of an automobile showing this invention applied thereto.

Fig. 2 is a side elevation of the same.

Fig. 3 is a detail perspective view of a connecting rod employed.

Fig. 4 is a detail perspective view of the connecting lamp rod as used in this invention.

Fig. 5 is a top plan view of the fore part of an automobile showing the device applied therto.

Fig. 6 is an enlarged detail side elevation of the lamp attachment and controlling means.

Fig. 7 is a vertical section of the combination lever mounted on the frame of an automobile.

Fig. 8 is a detail enlarged perspective view of the combination lever used.

Fig. 9 is a detail perspective view showing a coupling for connecting the device to the steering gear of an automobile.

Referring to the drawings, 10 designates a front part of an automobile and 11 a steering column of the usual construction carrying upon its lower end a steering arm 12 to which is connected by a coupling 13 one end of a connecting rod 14 of the usual construction, the coupling 13 also supporting one end of a connecting rod 15. The connecting rod 15 has on opposite ends flattened eyes 16 and 17 which are preferably in planes at right angles to each other. The flattened end 17 is bent at an angle to the longitudinal axis of the connecting rod 15 for the purpose which will be shown hereafter. The eye 16 of the rod is connected to the coupling 13 for moving the rod 15 by the adjustment of the steering mechanism. The eye 17 is connected to the eye 18, by a bolt or the like, of the lamp connecting bar 19. The connecting bar 19 has eyes 20 on opposite ends which are flat and are received within the forks 21 of rearwardly extending arms 22 of the combination levers or brackets for the lamps 23.

These brackets comprise cylindrical sleeve or body portions 24, receiving vertically therethrough spindles or bolts 25 which depend through laterally extending arms 26 mounted upon the forepart of the vehicle 10. Packing gaskets 27 are arranged between the underside of the arms 26 and the sleeves 24 to absorb vibration and to yieldingly hold the sleeves 24 in position when rotated. The upper end of each sleeve has a forwardly projecting ear or lug 28 receiving through the outer end thereof the shank 29 of a lamp fork, which latter is secured to the lug 28 by a nut or the like in the usual manner of attaching the fork to brackets. The nut 30 is threaded upon the lower end of the spindle 25 and bears against the lower end of the rotatable bracket 24 to support the latter.

The connecting bar 19 has its opposite ends offset upwardly to dispose the intermediate portion of the bar beneath the frame of the vehicle and in position for connection to the steering mechanism. The devices of this invention are so formed and assembled as to accommodate the device to vehicle frames without interfering with or necessitating a change in construction of any of the parts of the frame. The lamps 23 may be adjusted into practically any angle corresponding with the adjustment of the road steering wheels and are adapted to project light rays in the general direction of travel of the road steering wheels at all times whether the vehicle be traveling in a straight path or in a curve. The device comprises but relatively few parts, easily and quickly assembled upon the frame of the vehicle and supports the lamps in substantially the usual position occupied by lamps.

It is, of course, understood that various changes and modifications may be made in the details of construction and design of the above specifically described parts of this invention without departing from the spirit thereof, such changes and modifications being restricted only by the scope of the following claims.

I claim:—

1. In a dirigible headlight for automobiles, the combination of a bracket member comprising an elongated sleeve provided on its lower end with a laterally extending operating arm and on its upper end with a supporting lug adapted to carry the usual lamp fork, an elongated bolt adapted to be passed through a side portion of the automobile and to be suspended therefrom, said sleeve being adapted to surround the lower portion of the bolt, a nut on the lower end of the bolt for maintaining the sleeve thereon, and a cushion element between said side portion of the automobile and the upper end of the sleeve for preventing vibration of the parts and yieldingly holding the bracket in adjusted position.

2. The combination with a motor vehicle having a laterally extending portion at its front end, of a headed bolt adapted to be suspended through said laterally extending portion, a one-piece bracket comprising an elongated sleeve adapted to fit over the lower end of the bolt and having on its lower end an integral outstanding operating arm adapted to project rearwardly and to be swung for turning the sleeve, said sleeve also being provided with an outstanding lamp bracket supporting lug on its upper end, and supporting means on the lower end of the bolt for retaining the sleeve thereon.

3. In a dirigible headlight for motor vehicles having steering mechanism including a steering arm, the combination of a pair of bolts adapted to be suspended at opposite sides of the vehicle, a pair of one-piece brackets adapted to be mounted for rotation on the lower ends of the bolts and having forwardly extending lugs on their upper ends to receive lamp carrying forks and provided on their lower ends with rearwardly extending arms, a connecting bar provided at opposite ends with means for pivotal engagement with the arms for moving the same simultaneously, and a connecting rod pivoted at opposite ends to said bar and to the steering arm of the vehicle.

4. In a dirigible headlight for motor vehicles, the combination with a vehicle provided with a steering mechanism including a steering column having a steering arm upon its lower end, a steering rod, and a coupling between the arm and rod, of a pair of bolts adapted to be suspended at opposite sides of the vehicle, a pair of brackets mounted for rotation upon the lower ends of the bolts and provided upon their lower ends with rearwardly extending arms and upon their upper ends with forwardly extending lugs adapted to support lamps, a connecting bar pivoted at opposite ends to the rearwardly extending arms, and a connecting rod pivoted at one end to an intermediate portion of the steering rod and at its other end pivoted to said coupling between the steering arm and the steering rod.

FRED H. OLIN.